(12) United States Patent
Kluczynski

(10) Patent No.: US 7,757,894 B2
(45) Date of Patent: Jul. 20, 2010

(54) BUILT-IN TIP FOR A BAG AND METHOD OF MAKING SAME

(75) Inventor: Paul F. Kluczynski, Williamsville, NY (US)

(73) Assignee: Bison Bag Co., Inc., Lockport, NY (US)

( * ) Notice: Subject to any disclaimer, the term of this patent is extended or adjusted under 35 U.S.C. 154(b) by 679 days.

(21) Appl. No.: 11/583,616

(22) Filed: Oct. 19, 2006

(65) Prior Publication Data

US 2007/0280569 A1 Dec. 6, 2007

Related U.S. Application Data

(60) Provisional application No. 60/728,521, filed on Oct. 20, 2005.

(51) Int. Cl.
*B65D 35/28* (2006.01)

(52) U.S. Cl. .................. 222/107; 222/92; 222/494; 222/575; 383/906

(58) Field of Classification Search .............. 222/92, 222/107, 494, 566, 575; 383/36, 43, 44, 383/46, 49, 906; 401/152
See application file for complete search history.

(56) References Cited

U.S. PATENT DOCUMENTS

| | | | | |
|---|---|---|---|---|
| 1,296,884 A | * | 3/1919 | Volk | 222/494 |
| 1,409,544 A | * | 3/1922 | Hallock | 222/107 |
| 2,499,528 A | | 3/1950 | Reitzes | |
| 2,696,342 A | * | 12/1954 | Toborg | 222/529 |
| 3,200,996 A | * | 8/1965 | Picatti | 222/107 |
| 3,381,874 A | * | 5/1968 | Russo | 383/95 |
| 3,520,471 A | | 7/1970 | Faust | |
| 3,610,477 A | * | 10/1971 | Herzig | 222/494 |
| 3,666,145 A | * | 5/1972 | Fisher | 222/107 |
| 3,687,358 A | | 8/1972 | Wink et al. | |
| 4,648,513 A | | 3/1987 | Newman | |
| 4,844,917 A | | 7/1989 | DeLorimiere | |
| 5,005,734 A | * | 4/1991 | Van Gordon et al. | 222/107 |
| 5,090,597 A | * | 2/1992 | Johnson | 222/107 |
| 5,114,044 A | | 5/1992 | Spanek, Jr. | |
| 6,050,451 A | * | 4/2000 | Hess et al. | 222/92 |
| 6,074,097 A | | 6/2000 | Hayashi et al. | |
| 6,132,351 A | | 10/2000 | Lotto et al. | |
| 6,783,276 B2 | * | 8/2004 | Machacek et al. | 383/36 |
| 2003/0051440 A1 | | 3/2003 | Chow et al. | |
| 2003/0146247 A1 | * | 8/2003 | Oren et al. | 222/494 |
| 2003/0169947 A1 | | 9/2003 | Taheri | |
| 2003/0215165 A1 | | 11/2003 | Hogan et al. | |

* cited by examiner

*Primary Examiner*—Kenneth Bomberg
(74) *Attorney, Agent, or Firm*—David L. Principe

(57) ABSTRACT

A built-in tip having first and second tip members joined to a flexible packaging or bag and for dispensing product. The first and second tip members are capable of taking on generally conical shape that conforms with the conical shape of the bag. The bag having the built in tip is embodied with or without a non-invasive tear mechanism or non-invasive cuts for opening the bag. The non-invasive tear mechanism comprises a plurality of junctions formed in flexible packaging that that extend through the bag and partly into the first and second tip members.

7 Claims, 15 Drawing Sheets

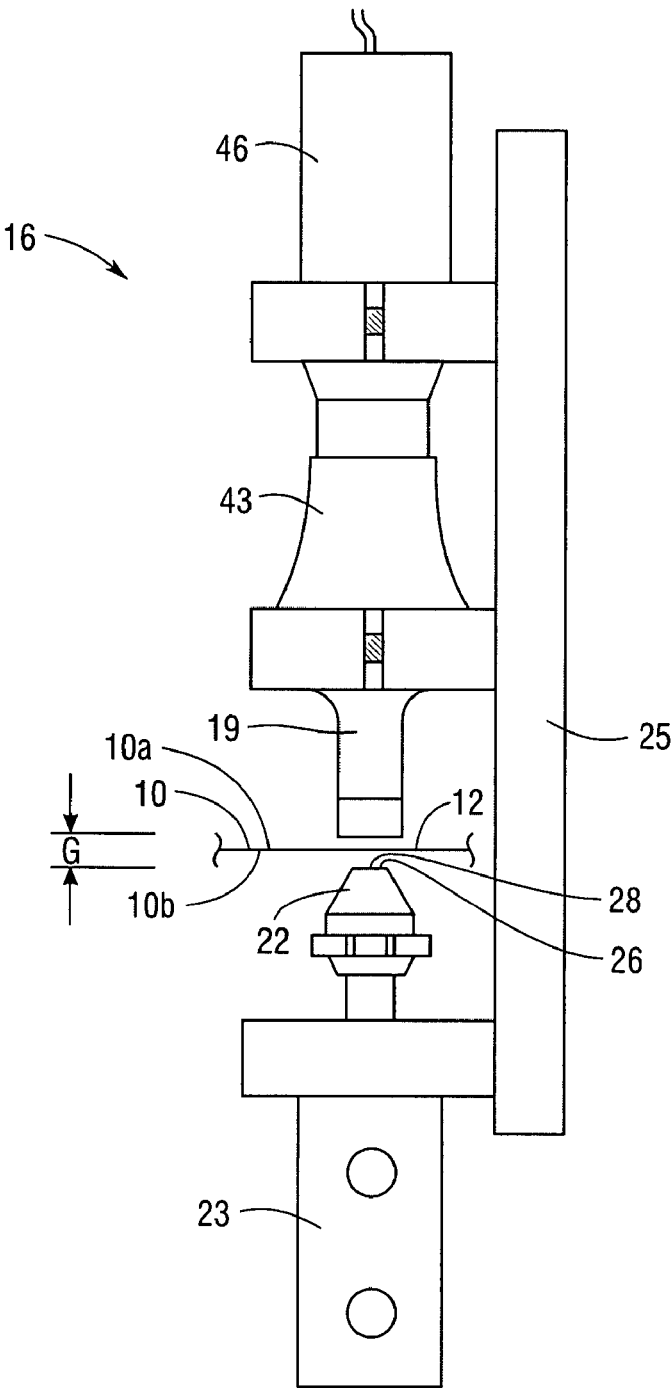
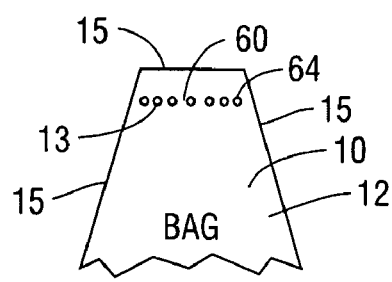
FIG.1B
FIG.1A

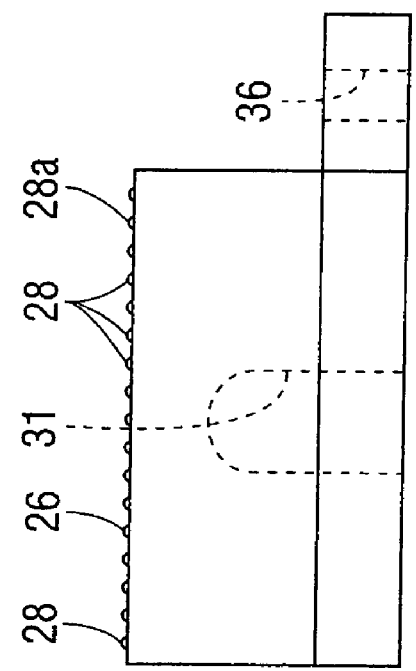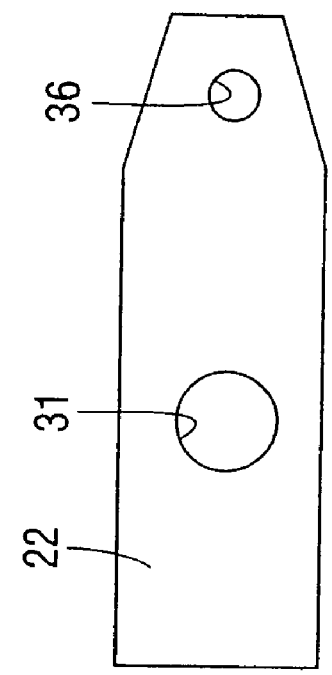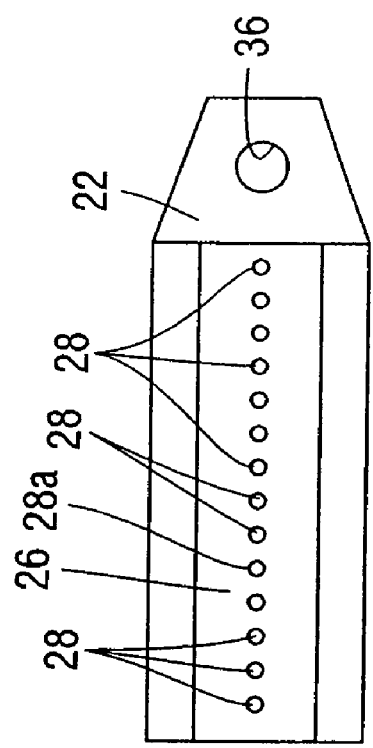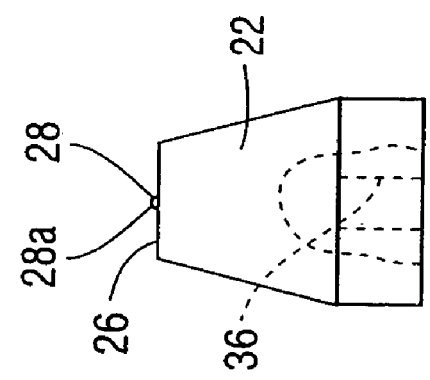

BUILT-IN TIP FOR A BAG AND METHOD OF MAKING SAME

This application claims priority of U.S. Provisional Patent Application No. 60/728,521 filed on Oct. 20, 2005 to Paul F. Kluczynski, for a "Built-In Tip for a Bag and Method of Making Same," the disclosure of which is hereby incorporated by reference.

FIELD OF INVENTION

The present invention relates to a bag or flexible packaging having a built-in tip and method of making same.

BACKGROUND

Products and goods oftentimes are packaged in the flexible packaging, which is frequently made of plastic. The flexible packaging is used to hold food products, cement, fertilizer, fluids of all kinds, and other materials.

However, the use of flexible packaging is not without problems. Indeed, many people attempt to open the flexible packaging with their fingers, only to find that the task is very difficult, because the plastic or other material from which the flexible packaging is made has a high tensile strength. The flexible packaging may even stretch before the user gains access to the contents. Such rough handling of the flexible packaging is not desirable because the product housed inside the flexible packaging could be damaged, as is frequently the case when, for example potato chip bags are opened.

In addition, people, in an attempt to open such packaging, have been known to resort to using their teeth to create a break in the flexible packaging. This can cause dental damage. People also resort to using various objects to puncture the flexible packaging, for example a pen or pencil when there is no sharp cutting instrument handy. As a result of using such articles, the person could unintentionally jab himself or herself.

Past attempts to overcome this problem have made use of expensive materials and fabrication techniques. For example, lasers have been used in an attempt to burn the flexible packaging in order to create a way to gain access to the interior of the flexible packaging. However, lasers typically burn completely through the flexible packaging and are difficult to control. Thus, the laser undesirably causes invasive openings to be formed in the flexible packaging. In addition, lasers are dangerous, especially in a factory setting, and they are expensive to purchase and require expensive support equipment.

Thus, there is a need for a tear mechanism for flexible packaging or bags that is inexpensive. There is a need for the tear mechanism be to reproducible, such that the flexible packaging having the tear mechanism can be mass produced. Also, there is a need for the tear mechanism to be easy to manually open, so that the need for scissors and knives is eliminated. Also, the tear mechanism has to be such that it does not compromise the seal of flexible packaging containing, for example, perishable items. Additionally, there is also a need for an apparatus that can form the tear mechanism in the flexible packaging.

In addition, oftentimes in order to dispense the product housed in the bag or the flexible packaging an unattached molded tip is dropped into the flexible packaging. A tip such as this is shown in FIG. 9 which is a perspective view of a prior art tip 1000. Machines are commonly used to introduce these unattached tips into bags. As shown in FIG. 9, the tip has a generally truncated conical shape having a narrow diameter end and an opposed large diameter end, with spaced apart teeth or points being formed at the narrow diameter end that extend about the periphery of the unattached tip. After the unattached tip is introduced into the bag, its exterior surface contacts the interior surface of the bag. Cutting the flexible packaging in the vicinity of the tip allows the product to flow out of the flexible packaging. Unattached tips such as the one shown in FIG. 9 are commonly used for applying frostings in the cake decorating industry. When the frosting is extruded from the flexible packaging it is supposed to take on a visually desirable contour or pattern as it flows past the spaced apart points of the unattached tip.

However, unattached tips are problematic. The unattached tip can turn or twist while the frosting is being forced out of the bag making it impossible to obtain the desired contour decorative pattern in the frosting, resulting in the entire bag and contents thereof having to be discarded. Another problem associated with unattached tips is that is that the unattached tip can work its way out of the flexible packaging and undesirably make its way into, for example, a cake. This tip then becomes a choking hazard and can result in injuries if bitten or swallowed. In addition, such tips are relatively expensive, and thus undesirably add to costs.

Thus, there is a need for a better way to dispense product from a bag or flexible packaging.

SUMMARY

The built-in tip satisfies the above-described needs and includes bags having a built-in tips. The bag has a load end, a substantially opposed extruding end, an interior surface and an exterior surface. A bag side wall extends between the load end and the extruding end.

The built-in tip includes a first tip member and an identically shaped second tip member, both of which are have body portions that are planar. The first and second tip members are formed by cutting them from a sheet of plastic, for example, polyester, and they can also be formed by molding. The body portion has elongate portions and edge portions that extend therefrom, and the elongate portions and edge portions taper inwardly in a direction toward a first end of the first tip member. Defined between the elongate portions and edge portions and between the elongate portions are recesses. Extending from the opposite side of the body portion are extruding portions having tip ends that are spaced from one another. Extending between the extruding portions are dispensing recesses that extend to long narrow openings or slits, and the slits extend into the elongate portions. The slits allow the first tip member to be capable of being forced into an essentially conical shape, such that the first tip member narrows in a direction toward the extruding portions when the flexible packaging is filled with product. The extruding portions provide for a desired surface pattern in the product being extruded from the bag. In addition, because the first tip member comprises a stiff polyester it has longitudinal strength and stiffness along the elongate portions, elongate edge portions and extruding portions. This provides for a stiff, yet radially flexible, first tip member such that product can be easily and cleanly dispensed. The second tip member is identically shaped. In other embodiments, the built-in tip can be cut or formed in any shape that easily allows it to conform to the cone shape of the bag. In other embodiments, the first and second tip members are not identical, for example the first tip member can have two extruding portions and the second tip member can have four extruding portions. This would allow a user to alter the shape of the product being dispensed by turning over the bag.

To make the bag having the built-in tip a spool of film web from which film is pulled or advanced by a capstan is provided. Next, the first and second tip members are symmetrically adhered or otherwise joined to the film, such that the narrow ends of the first and second tip members point in a direction toward one another, and the wide ends flare away from one another. The film is then moved over a V-board that folds the film over on itself, such that the first and second tip members overlie one another, and are aligned with one another. It is pointed out that depending on how the film to which the first and second tip members are adhered is moved across the V-board, the first and second built-in tip members will be on either the exterior surface of the completed bag, or the internal surface of the completed bag such that they contact one another. In each instance, the first and second tip members with align with one another. Also, in one of the embodiments, the above-described non-invasive tear mechanism is formed in the folded film at this time.

Next, heat seals are formed in the film to define the geometry of the bag to be formed. Of course, a fill opening is not heat sealed between the seams so that so that product can be loaded into the bag through the load end. The heat seals are then lance cut, thus separating the bags from one another.

One of the advantages of this design is that the finished bags allow for the convenient stacking and handling of the bags, because the bags will, when not filled with product remain flat.

After the bag is filled with product the flat cut first and second tip members are capable of curving outward taking on a conical shape. This conical shape of the bag forces the narrow ends of the first and second tip members to point inwardly in the direction of the focus of the cone. The extruded product is thus star shaped as it is forced through the tip extensions.

In addition, in another embodiment the bag can have the built-in tip and a non-invasive tear mechanism, such that when the non-invasive tear mechanism is torn the built-in tip allows for product to be extruded from the bag. A bag or flexible packaging is formed by an apparatus comprising an ultrasound horn and anvil that form a non-invasive tear mechanism in the bag. The tear mechanism is non-invasive in that there is no hole, opening, or scoring of the flexible packaging after the non-invasive tear mechanism has been formed. The flexible packaging comprises a horn side wall or first wall and an anvil side wall or second wall which are joined together, and the non-invasive tear mechanism is formed in the flexible packaging. The non-invasive tear mechanism comprises spaced apart junctions that are formed in a substantially straight line in the flexible packaging. Thus, the spaced apart junctions form a line of weakness in the flexible packaging, such that when the bag is torn in the vicinity of the spaced apart junctions it tears along a substantially straight line defined by the junctions.

There is also an apparatus used for making the non-invasive tear mechanism in a flexible packaging or bag. The apparatus comprises a carriage, an ultrasonic horn joined to and carried by the carriage, and an anvil joined to and carried by the carriage. The anvil has a work surface. The horn further comprises a transducer and a booster. The anvil is movable toward and away from the ultrasonic horn by a limiting actuator, for example a pneumatic, hydraulic, mechanical, or electrical actuator. An actuating rod is provided and the anvil defines a cavity used for receiving the actuating rod therein. The actuating rod used for reciprocating the anvil toward and away from the ultrasound horn. A pattern of protuberances extends from the anvil work surface. The pattern of protuberances extending from the anvil work surface is used for creating the non-invasive tear mechanism in the flexible packaging, when the anvil work surface and ultrasonic horn are moved into position on both sides of the flexible packaging and the ultrasonic horn is activated. In particular, the pattern of protuberances formed in the anvil work surface is used for producing the spaced apart junctions in the flexible packaging that form a line of weakness in the in the flexible packaging. The flexible packaging can be manually torn open along the line of weakness by applying shearing force or tension force to the flexible packaging at the line of weakness. Knives and scissors are not required to gain access to the interior of the flexible packaging.

It is pointed out that the line of weakness is not so weak that the product contained within the flexible packaging bursts out of the flexible packaging during the normal handling of the flexible packaging by a user. It is further pointed out that the tear mechanism is non-invasive in that there are no punctures or openings formed in the tear mechanism or in the vicinity of the tear mechanism, and there are no score lines or openings in either of the horn side wall or anvil side wall. The protuberances in the pattern of protuberances can have various shapes, for example an X-shape, a circle, a diamond, a rectangle, a polygon, and similar shapes. Also, it is to be understood that the flexible packaging can be formed from a continuous tube of packaging.

BRIEF DESCRIPTION OF THE DRAWINGS

The built-in tip is illustrated in the drawings in which like reference characters designate the same or similar parts throughout the figures of which:

FIG. 1A is a front elevational view of an apparatus for producing the non-invasive tear mechanism.

FIG. 1B is a top plan view of a portion of a flexible packaging having the non-invasive tear mechanism.

FIG. 3 is a top plan view of the anvil of the apparatus for producing the non-invasive tear mechanism.

FIG. 4 is a side elevational view of the anvil of the apparatus for producing the non-invasive tear mechanism.

FIG. 5 is a bottom plan view of the anvil of the apparatus for producing the non-invasive tear mechanism.

FIG. 6 is an end elevational view of the anvil of the apparatus for producing the non-invasive tear mechanism.

DETAILED DESCRIPTION

At the outset, it noted that like reference numbers are intended to identify the same structure, portions, or surfaces consistently throughout the figures.

Figure 7:
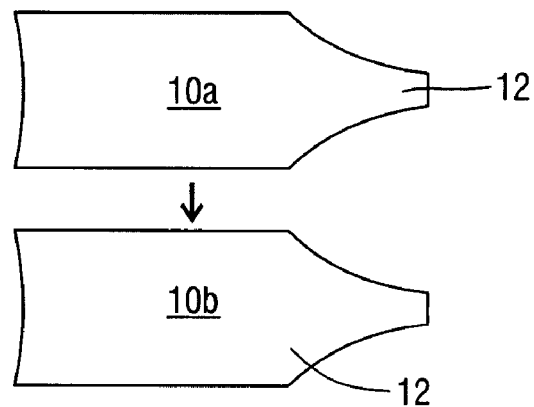
FIG. 7 is a perspective view of the horn side wall of the flexible packaging and anvil side wall of the flexible packaging before they are joined to form the flexible packaging.
Figure 7A:
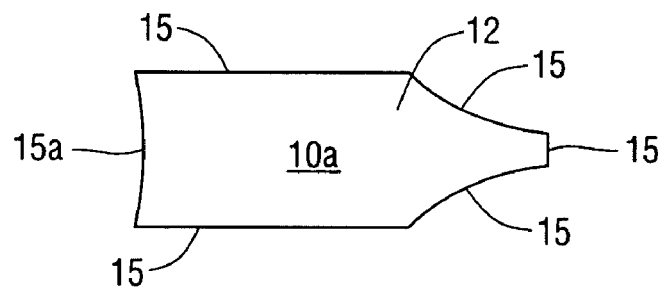
FIG. 7A is a top plan view of the flexible packaging having a fill opening.

Referring generally to FIGS. 1-6 and initially to FIGS. 1A, 7 and 7A, a bag or flexible packaging 10 is provided. The flexible packaging 10 has a horn side wall 10a (also referred to herein as a first side) and an anvil side wall 10b (also referred to herein as a second side) which are joined together along a peripheral junction 15. There is a fill opening 15a in the peripheral junction 15 where the horn side wall 10a and anvil side wall 10b are not joined. The fill opening 15a, shown in FIG. 7A, is used for filling the flexible packaging 10 with product 100 as will be described presently.

A non-invasive tear mechanism 13 (FIG. 1B) is formed in the flexible packaging 10 by a system or apparatus 16 as shown in FIGS. 1A and 2A. The tear mechanism 13 is non-invasive in that there is no hole, scoring, or opening associated with the tear mechanism 13 in the flexible packaging 10. That is, there is no hole, opening or scoring made in the horn side wall 10a or in the anvil side wall 10b of the flexible packaging 10 when the non-invasive tear mechanism 13 is formed. Thus, the material 12 from which the flexible packaging 10 is made retains its integrity, and nothing from the surrounding environment can enter the flexible packaging 10 through the non-invasive tear mechanism 13, and nothing from the interior of the flexible packaging 10 can escape into the surrounding environment through the non-invasive tear mechanism 13. The non-invasive tear mechanism 13 is thus suitable for use in flexible packagings 10 used for holding perishables such as food products, as well as non-perishable goods, for example cement or fertilizer.

The flexible packaging 10 can be made out of a plurality of different materials 12 including, but not limited to, plastics, plastic films, plastic films made out of low density polyethylene (LDPE), high density polyethylene (HDPE), polyester (PET), oriented polypropylene (OPP), biaxially oriented polypropylene (BOPP), nylon, biaxially oriented nylon, and laminated materials such as poly to poly, prop to poly, nylon to poly, prop to prop, pet to poly, and the like. The materials 12 may include 3, 5, and 7 layer coextruded films including substrates formed out of any of the materials set forth above. The plastic film may also comprise polyolefin.

The material 12 comprises films having a thickness of about 1.5 mil to about 4.0 mil. Thus, the horn side wall 10a and anvil side wall 10b may each comprise a thickness of about 1.5 mil to about 4.0 mil. As will be evident to those of ordinary skill in the art, other materials and the thicknesses of the horn side wall 10a and anvil side wall 10b may also be suitable.

Figure 2:
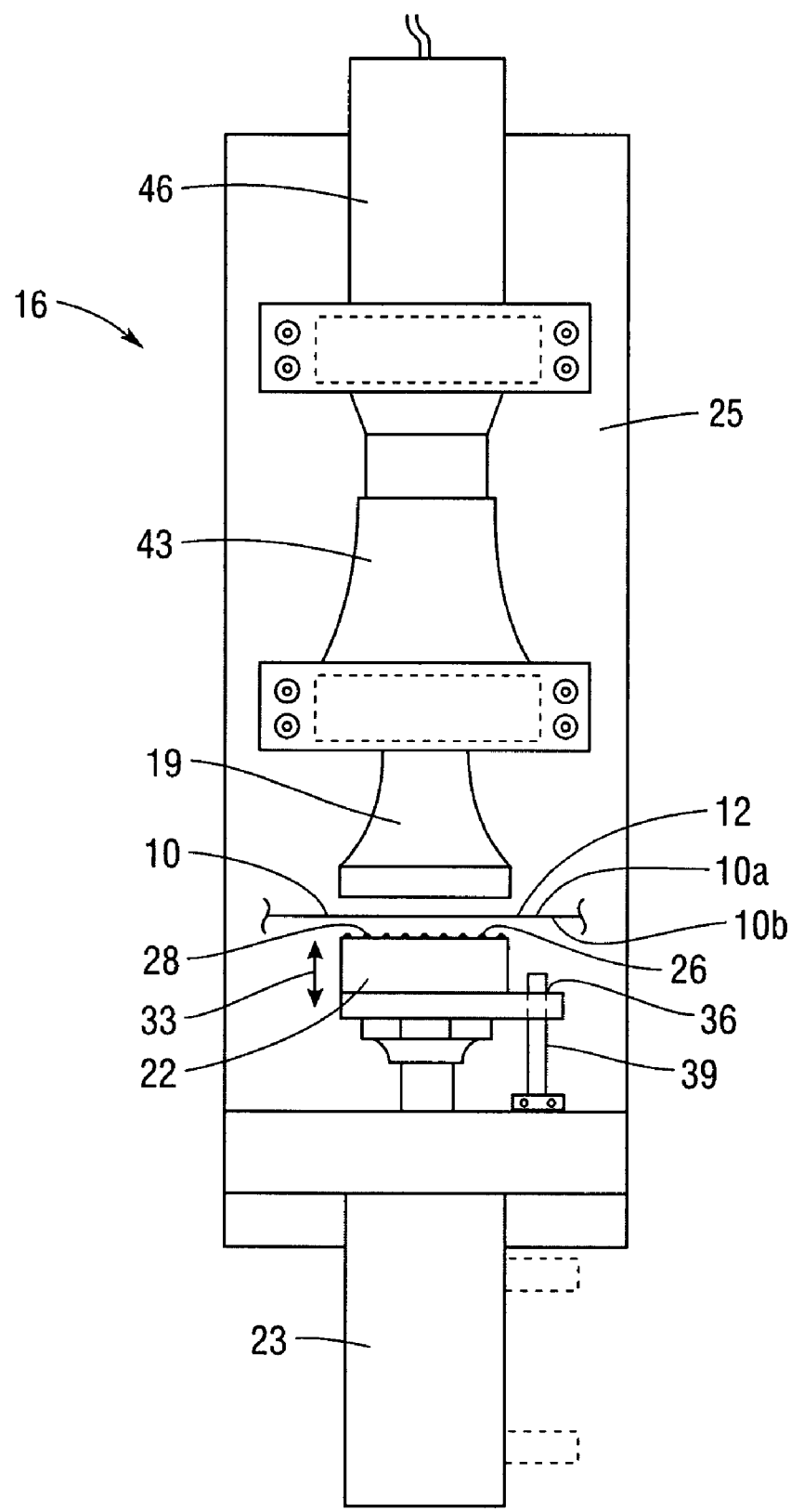
FIG. 2 is a side elevational view of the apparatus for producing the non-invasive tear mechanism.

As shown in FIGS. 1A and 2, the non-invasive tear mechanism 13 is produced by an ultrasonic horn 19 and an anvil 22. In an embodiment, the horn 19 and anvil 22 are mounted on a carriage 25 which provides for adjustment of the position of the horn 19 and anvil 22 in all axes. There is a gap, designated G in FIG. 1, defined between the horn 19 and the anvil 22. The anvil 22 also has a work surface 26 and a pattern of protuberances 28 extends from the work surface 26 of the anvil 22. In a embodiment, the pattern of protuberances 28 is formed in a substantially straight line. As will be described presently, the pattern of protuberances 28 can be otherwise embodied.

In order to produce the non-invasive tear mechanism 13 in the flexible packaging 10, the flexible packaging 10 is moved into position in the gap designated G defined between the horn 19 and the anvil 22. The flexible packaging 10 may be brought into position manually or by use of a conveyor (not shown). Conveyors and the use of conveyors to move and position sheets and films of material 12 is well known to those having ordinary skill in the art.

The work surface 26 of the anvil 22 is brought into position adjacent the anvil side wall 10b of the flexible packaging 10. The anvil 22 is brought into position by an actuator cylinder 23 that houses an actuating rod 23a which is received in a cavity 31 defined in the anvil 22, as shown in FIGS. 1, 2, 4 and 6. The actuator cylinder 23 can be hydraulic, pneumatic, or mechanical, such actuator cylinders 23 well known to those having ordinary skill in the art. The actuator cylinder 23 is joined to the carriage 25. FIG. 4 shows the anvil 22 is provided with a cavity 31 for attachment to an actuating rod 23a that is actuated by the above-described actuator 23 for moving the anvil in the direction of arrow 33 (FIG. 2).

In other embodiments, the anvil 22 and horn 19 may be brought together by a means for positioning that moves the horn 19 and anvil together 22 with a scissors type action, or mechanical moves the horn 19 and anvil 22 together.

The anvil 22 may also be provided with an opening 36 to provide a guide for maintaining the alignment of the anvil 22 during its reciprocating motion as it forms the non-invasive tear mechanisms 13. The anvil 22 slides back and forth along a post 39 (FIG. 2) by means of the opening 36 defined in the anvil 22 to maintain alignment.

In a embodiment, the horn 19 is part of a 20 kilohertz (kHz) heavy duty ultrasonic probe including a titanium booster 43, a transducer 46, and a titanium horn assembly. One example of this type of probe is Model No. 41C30, available from Dukane Corporation, located in St. Charles, Ill. Other ultrasonic horns and frequencies may also be suitable. For example, in other embodiments, the ultrasonic frequency may be in the range of between about 20 kHz to about 80 kHz. It is noted that the ultrasonic horn 19 functions by generating heat from high frequency mechanical motion, and this heat is used for fusing layers of material 12 together. Ultrasonic horns well are known to those having ordinary skill in the art.

Then, once the horn 19 and anvil 22 are brought together, the horn 19 is actuated and generates an ultrasonic pulse. The ultrasonic pulse causes the layers of the flexible packaging 10 that is positioned between the horn 19 and anvil 22 to fuse together in a pattern corresponding to the pattern of protuberances 28 disposed on the work surface 26 of the anvil 22. Thus, the anvil side wall 10b and horn side wall 10a are fused together at each protuberance 28a in the pattern of protuberances 28. Where the horn side wall 10a and anvil side wall 10b are fused together in this manner, junctions 60 are formed in the flexible packaging 10.

The junctions 60 are spaced apart, and each junction 60 corresponds with a protuberance 28a that extends from the anvil work surface 26. It is noted that there is no opening, hole, scoring, or slit in the flexible packaging or bag 10 after the non-invasive tear mechanism 13 has been formed in the above-described manner.

The spaced apart junctions 60 are in a substantially straight line, as shown in FIG. 3, and form a line of weakness 64 in the in the flexible packaging 10. The junctions 60 are formed in this substantially straight line because, as shown in FIGS. 2, 3, and 6, the pattern of protuberances 28 extending from the work surface 26 of the anvil 22 is in a substantially in a straight line.

It is noted that the horn 19 and anvil 22 do not contact one another when the junctions 60 are formed in the flexible packaging 10.

It is noted that in other embodiments, the ultrasonic horn may be replaced with a hot knife, a heated tool, a microwave generation device, or a radio frequency generating device, so long as it can fuse the horn side wall 10a and the anvil side wall 10b at the junctions 60. Such devices are well known to those having ordinary skill in the art.

Figure 7B:
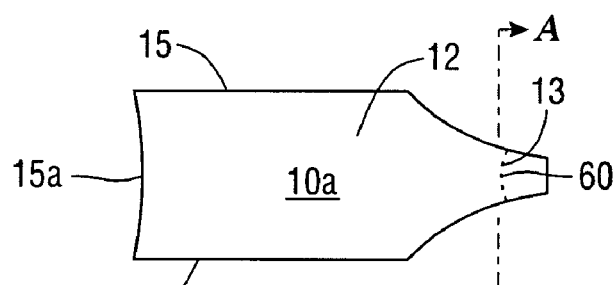
FIG. 7B is a top plan view of the flexible packaging having a non-invasive tear mechanism.
Figure 7C:
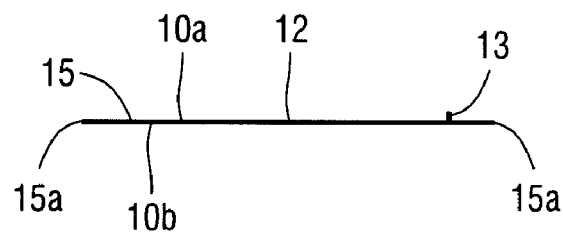
FIG. 7C is a front elevational view of the flexible packaging having a non-invasive tear mechanism.
Figure 7D:
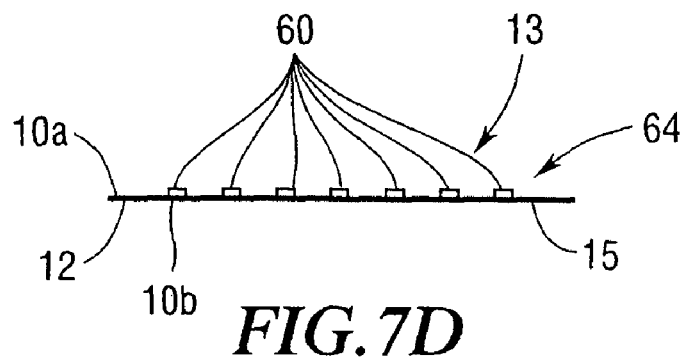
FIG. 7D is a right side elevational view of the flexible packing having a non-invasive tear mechanism.
Figure 7E:
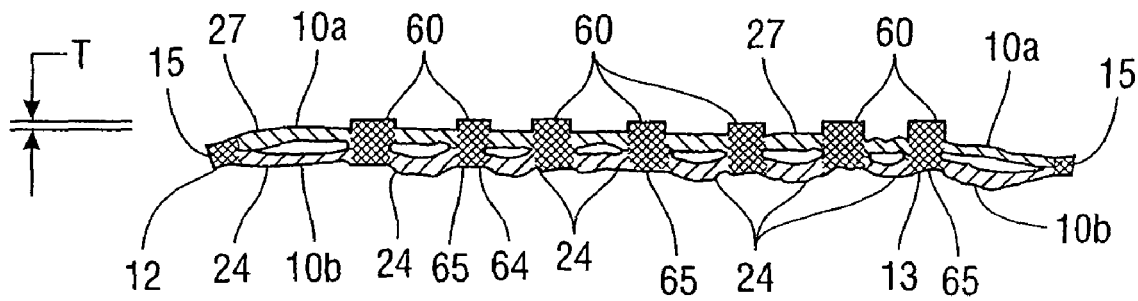
FIG. 7E is a sectional view of the non-invasive tear mechanism taken along cut line A-A of FIG. 7B.
Figure 7F:
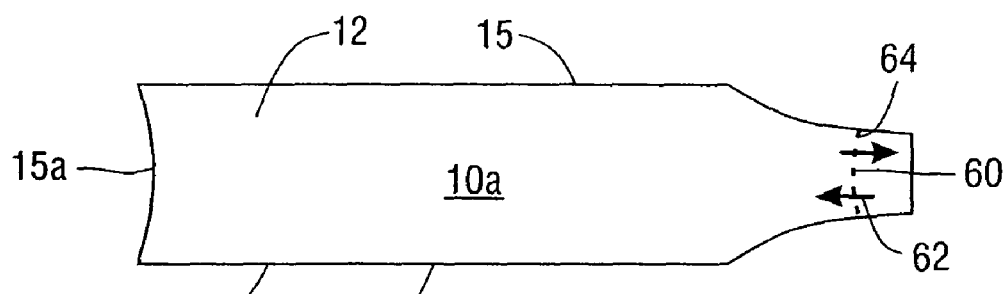
FIG. 7F is a top plan view of the flexible packaging having a non-invasive tear mechanism loaded with product, showing the movement of product between junctions.
Figure 7G:
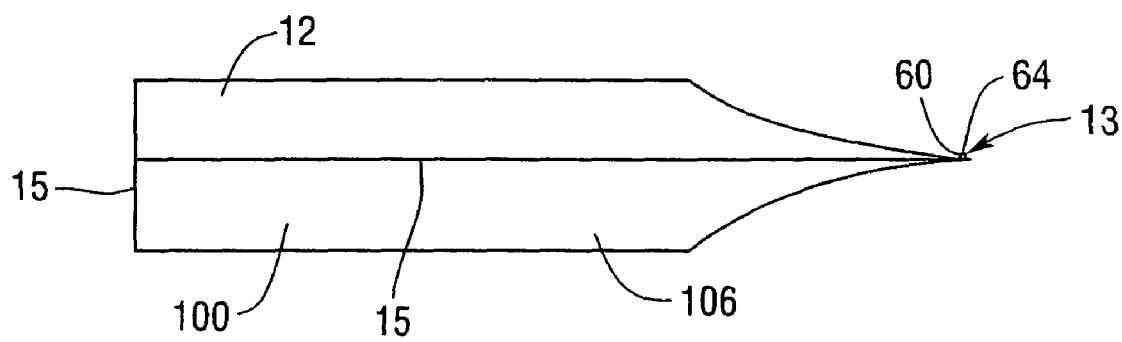
FIG. 7G is a front elevational view of the flexible packaging having a non-invasive tear mechanism loaded with product.
Figure 7H:
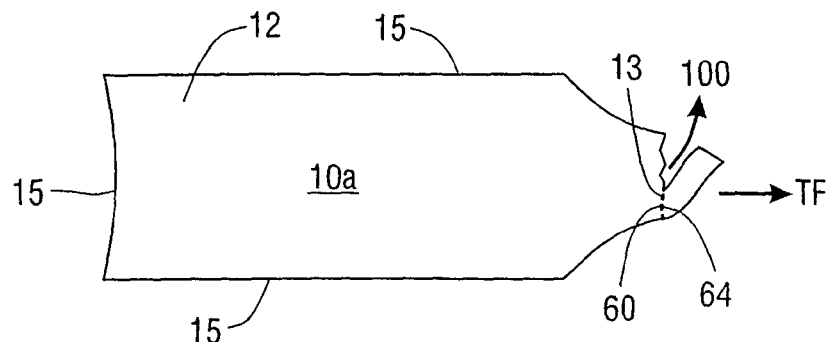
FIG. 7H is a top plan view of the flexible packaging loaded with product wherein the non-invasive tear mechanism is shown partly torn by a tension force.
Figure 7I:
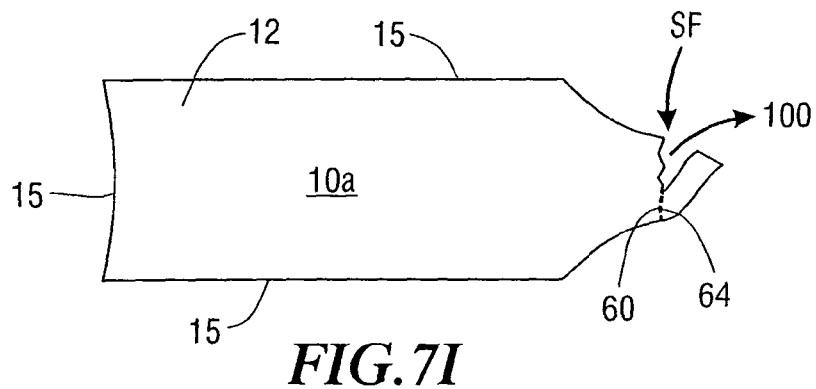
FIG. 7I is a top plan view of the flexible packaging loaded with product wherein the non-invasive tear mechanism is shown partly torn by a shearing force.
Figure 7J:
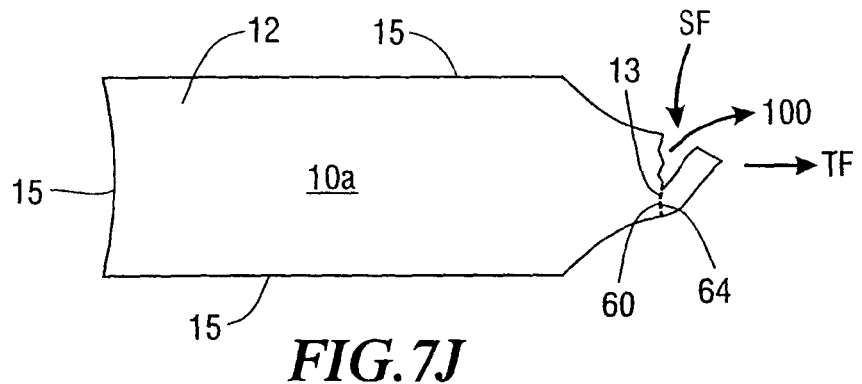
FIG. 7J is a top plan view of the flexible packaging loaded with product wherein the non-invasive tear mechanism is shown partly torn by both tension and shearing forces.

To open the flexible packaging 10, the line of weakness 64 is subjected to manually applied shearing forces as indicated by arrow SF in FIG. 7I, tensions forces as indicated by arrow TF in FIG. 7H, or a combination of shearing and tension forces as shown in FIG. 7J. The flexible packaging 10 will tear along the line of weakness 64 when such forces are applied, and the interior of the flexible packaging 10 can thus be accessed in this manner.

Shown in FIG. 3 is an embodiment wherein the pattern of protuberances 28 is linear. Such a linear arrangement produces a substantially linear arrangement of junctions 60 in the flexible packaging 10 and a substantially linear line of weakness 64. Additionally, each protuberance 28a has a geometrical shape. In an embodiment the each protuberance 28a in the pattern of protuberances 28 is X-shaped.

The non-invasive tear mechanism 13 thus allows food products, fluids, pastes, non-food products, cement, and the like to be stored internally in the flexible packaging 10 without leaking out of the non-invasive tear mechanism 13 to the surrounding environment. At the same time, environmental contaminants, fluids, and substances cannot move, migrate, seep, or flow into the interior of the flexible packaging 10 through the non-invasive tear mechanism 13. It is noted that the line of weakness 64 is not so weak that the product 100 housed in the flexible packaging 10 bursts out of the flexible packaging 10 during the normal handling of the flexible packaging 10 by a user.

FIGS. 7-7J show the method of forming the non-invasive tear mechanism 13, and opening the non-invasive tear mechanism 13. FIG. 7 shows the horn side wall 10a and the anvil side wall 10b before they are joined to form the flexible packaging 10. FIG. 7A shows the anvil side wall 10a and a horn side wall 10b joined along a peripheral junction 15. There is a fill opening 15a in the peripheral junction 15 where the horn side wall 10a and anvil side wall 10b are not joined. The peripheral junction 15 can be formed by conventional means known to those having ordinary skill in the art, for example by ultrasonic welding. The fill opening 15a is used for allowing access to the interior of the flexible packaging 10, so that the flexible packaging 10 can be loaded or filled with product 100 after the non-invasive tear mechanism 13 has been formed in the flexible packaging 10.

Then, the non invasive tear mechanism 13, as shown in FIG. 7B, is formed in the flexible packaging 10 in the manner described above by moving the flexible packaging 10 between the anvil 22 and horn 19 and closing the two together, and activating the horn 19. FIG. 7C shows a side elevational view of the flexible packaging 10, showing the non-invasive tear mechanism 13 extending from the horn side wall 10a. FIG. 7E shows a sectional view of the non-invasive tear mechanism 13 taken along cut line A-A of FIG. 7B. The junctions 60 of the non-invasive tear mechanism 13 each extend a distance, designated T in FIG. 7E, above the exterior surface 27 horn side wall 10a of the flexible packaging 10. In an embodiment, the distance T may be between about 20 percent to about 30 percent of the combined thicknesses of the horn side wall 10a and anvil side wall 10b. Accordingly, there are recesses 65 formed in flexible packaging 10 at the junctions 60, as shown in FIG. 7E. In other embodiments, the distance T could be more or less depending on a particular application or particular customer order. FIG. 7D is a right side elevational view of the flexible packaging 10 and the non-invasive tear mechanism 13.

After the non-invasive tear mechanism 13 has been formed in the flexible packaging 10, the flexible packaging 10 is loaded or filled with product 100 though fill opening 15a. The filling process can be part of an automated assembly line wherein product is automatically loaded into the flexible packaging 15, such automatic loading of flexible packaging 10 known to those having ordinary skill in the art. After filling the flexible packaging 10, the fill opening 15a is closed or sealed. The sealing can be by way of conventional means, for example ultrasonic welding. FIGS. 7F-7J all show the sealed flexible packaging 10 loaded with product 100.

After the flexible packaging 10 is loaded and sealed, external contaminates cannot gain access to the interior of the flexible packaging 10 through the non-invasive tear mechanism 13, because the non-invasive tear mechanism 13 does not have any no holes, openings, or scoring. Likewise, product 100 housed in the flexible packaging 10 interior cannot move out of the flexible packaging 100 through the non-invasive tear mechanism 13, since there are no openings, holes, or score lines. Thus, there is no way for product 100 to leak out of the packaging 10, and there is no way for contaminates to seep into the flexible packaging 10 through the non-invasive tear mechanism 13.

FIG. 7E is a sectional view taken along cut line A-A of FIG. 7B. As shown in FIG. 7F, product 100 internal to the flexible packaging 10 is free to move between the junctions 60 that form the line of weakness 64 as indicated by the arrows 62 shown between the junctions 60. This is due to the fact the junctions 60 that join the horn side wall 10a and anvil side wall 10b are at spaced intervals that mimic the pattern of protuberances 28 formed in the anvil 22 work surface 26.

Thus, where the non-invasive tear mechanism 13 is formed in the flexible packaging 10, spaces 24 are defined by the horn side wall 10a, the anvil side wall 10b, and the junctions 60. Product 100 can thus move between the spaced apart junctions 60 through these spaces 24, but the product 100 remains internal to the flexible packaging 10 until the non-invasive tear mechanism 13 is torn.

As shown in FIGS. 7I-7J, to open the flexible packaging 10, the user applies tension force TR, or shearing force SF, or a combination of both to the flexible packaging 10 in the vicinity of the noninvasive tear mechanism 13. When force is applied to flexible packaging 10 at the non-invasive tear mechanism 13, the non-invasive tear mechanism 13 tears at the junctions 60 and along the line of weakness 64. The flexible packaging 10 is thus easily opened without the use of scissors or knives.

In other embodiments, the geometrical shape of each protuberance 28a and the spacing between each protuberance 28a may be varied infinitely. For example, the shapes of each of the protuberances 28 may include dots, squares, polygons, diamonds, stars, X-shapes, or the like. The distances between each of the protuberances 28a can be as shown in the figures, or the distance may be more or less, depending on the particular application or customer requirement.

Figure 8A:
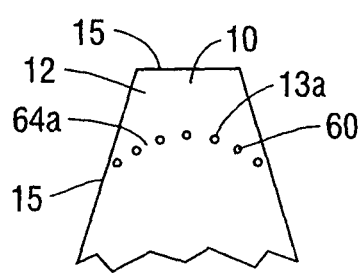
FIG. 8A is a top plan view of a flexible packaging have a non-invasive tear mechanism having a curved shape.
Figure 8B:
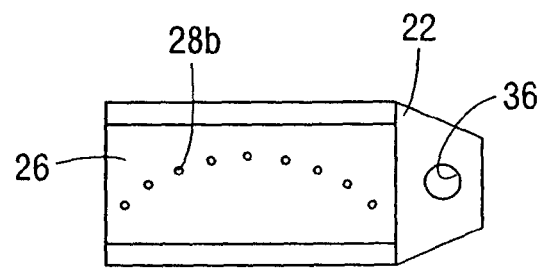
FIG. 8B is a top plan view of the anvil used for producing the non-invasive tear mechanism having a curved shape.
Figure 9:
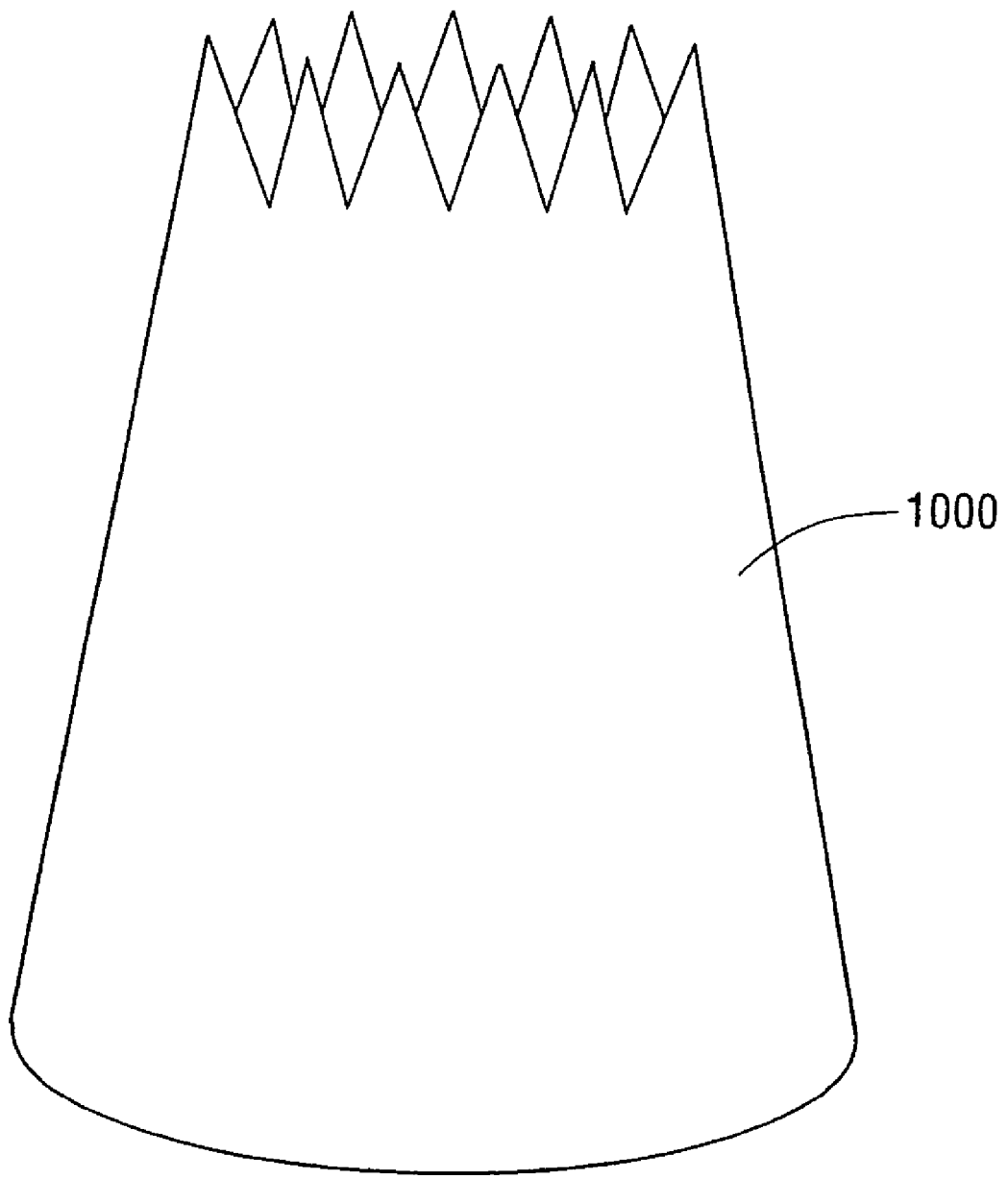
FIG. 9 is a perspective view of a prior art tip.

Another embodiment is shown in FIGS. 8A and 8B. The pattern of protuberances 28b extends from the working surface 26 of the anvil 22 in a curved arrangement, as shown in FIG. 8B. FIG. 8A is a top plan view of a flexible packaging 10 having a non-invasive tear mechanism 13a made with the anvil 22 having the curved pattern of protuberances 28b. As shown, the non-invasive tear mechanism 13a comprises junctions 60 which are formed in a curved shape thus forming a curve of weakness 64a in the flexible packaging 10.

In other embodiments the flexible packaging 10 can be rectangular shaped, circular shaped, triangular shaped, or may have any shape as required for a particular application. The flexible packaging can be a bag having a surrounding sidewall.

Figure 10:
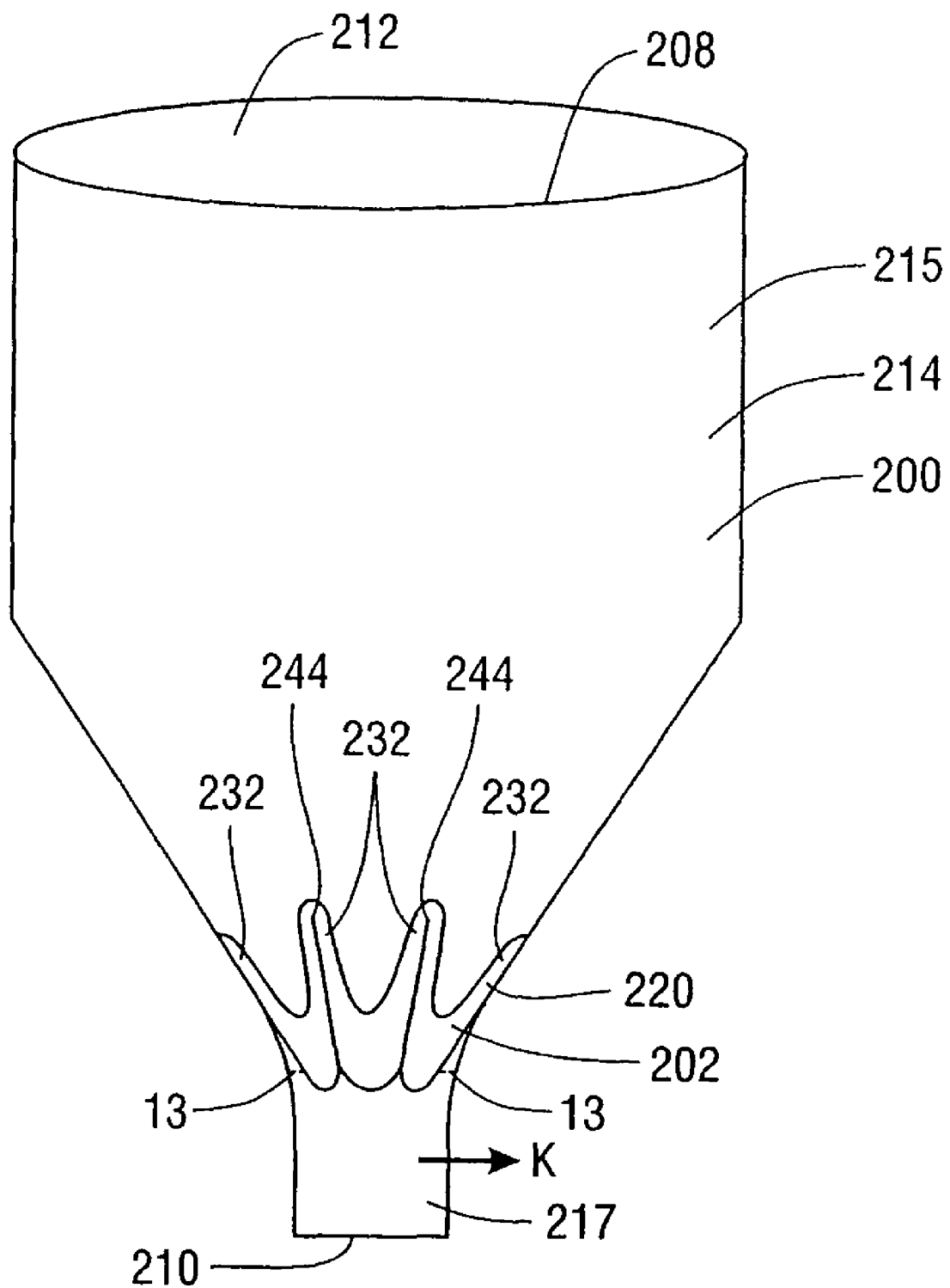
FIG. 10 is a perspective view of a bag or flexible packaging having a built in tip.
Figure 11:
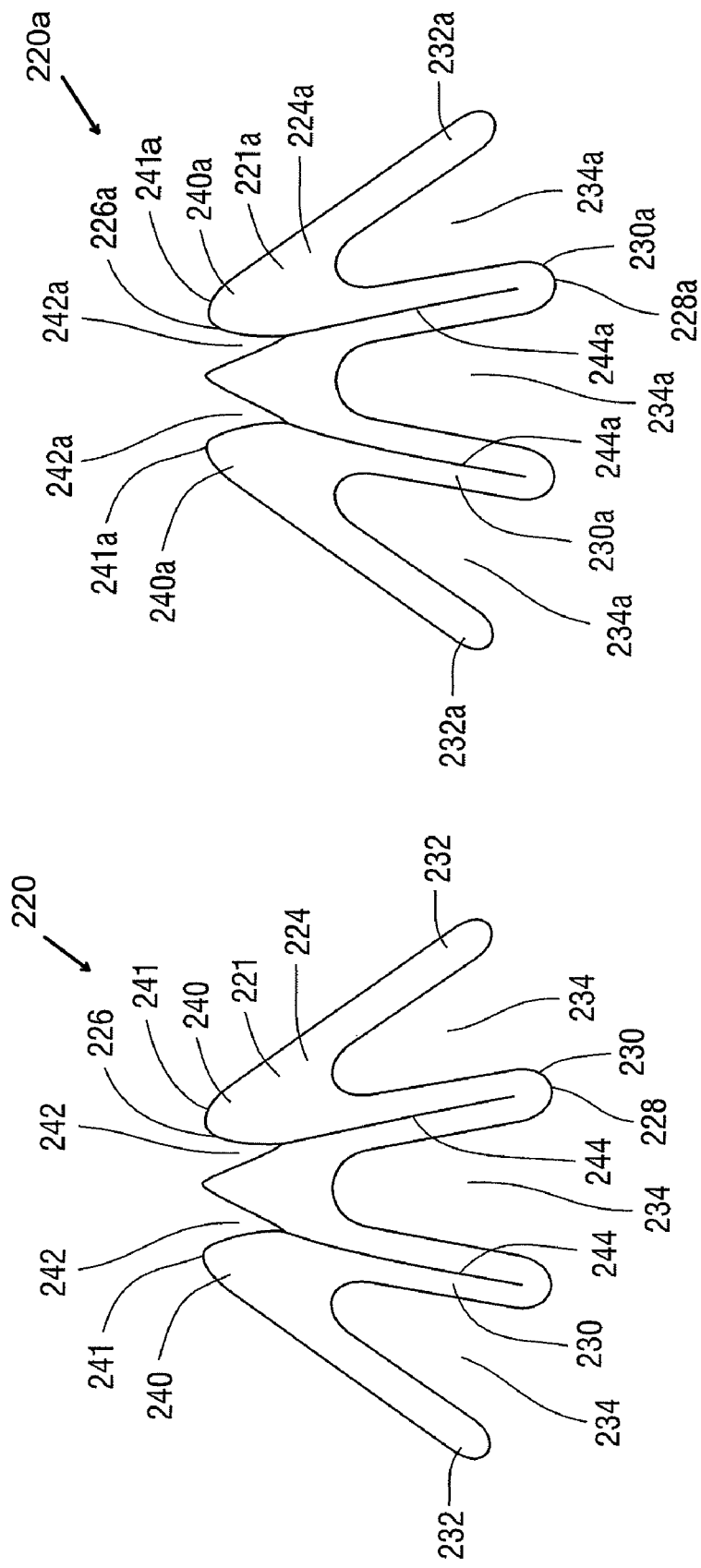
FIG. 11A is a top plan view of a first tip member of the built-in tip.
FIG. 11B is a top plan view of a second tip member of the built-in tip.

The built-in tip 202 is shown in FIGS. 10 and 11A-11B. The built-in tip 202 is for use with a flexible packaging 200 (also referred to herein as bag) having a built-in tip 202. In particular, FIG. 10 shows a perspective view of the bag 200 having the build-in tip 202. The bag 200 has a first end 208, an opposed extruding end 210, an exterior surface 214 and interior surface 212. A bag side wall or surrounding wall 215 extends between the first end 208 and the extruding end 210, as shown in FIG. 10. The bag 200 also has a removable portion 217 proximal the extruding end 210 that the user can manually remove as indicated by arrow K in FIG. 10. Once the removable portion 217 is removed, the product 100 internal to the bag 200 can be forced out of the bag 200 through the built-in tip 202. The bag 200 is made with or without the non-invasive tear mechanism 13.

As shown in FIG. 11A the built-in tip 202 includes a first tip member 220 having a body portion 224. The first tip member 220 is planar and has a thickness. The first tip member 220 is formed by die cutting or stamping it from a sheet of plastic, for example, stiff polyester, or is formed by molding. The first member has a first end 226 and an opposed second end 228. Elongate portions 230 and edge portions 232 extend from the body portion 224, and the elongate portions 230 and edge portions 232 taper inwardly in a direction toward the first end 226. Defined between the elongate portions 230 and edge portions 232 and between the elongate portions 230 are recesses commonly designated 234. Extruding portions 240 having tip ends 241 extend from the body portion 224 in a direction opposite that of the elongate portions 230, and are spaced from one another. Extending between the extruding portions 240 are dispensing recesses 242. The body portion 224 has slits or elongate narrow openings 244 that extend from the dispending recesses 242, through the body portion 224 and partly into the elongate portions 230, as shown in FIG. 11A. The first tip member 220 is capable of taking on an essentially conical shape due to the presence of the slits 244, i.e., such that the first tip member 220 narrows in a direction toward the extruding portions 240 when the flexible packaging 200 is filled with product 100. The extruding portions 240 provide for a desired surface pattern in the product 100 being extruded from the bag 200. In addition, because the first tip member 220 comprises a stiff polyester it has longitudinal strength and stiffness along the elongate portions 230, elongate edge portions 232 and extruding portions 240. This provides for a stiff, yet radially flexible, first tip member 220, such that product can be easily and cleanly dispensed.

As shown in FIG. 11B the built-in tip 202 has a second tip member 220a that is identical to the first tip member 220. The second tip member 220a has a body portion 224a and is formed by die cutting or stamping it from a sheet of plastic, for example, stiff polyester, or is formed by molding. The second tip member 220a is planar. The body portion 224a has a first end 226a and an opposed second end 228a. Elongate portions 230a and edge portions 232a extend from the body portion 224a, and the elongate portions 230a and edge portions 232a taper inwardly in a direction toward the first end 226a. Defined between the elongate portions 230a and edge portions 232a and between the elongate portions 230a are recesses commonly designated 234a. Extruding portions 240a having tip ends 241a extend from the body portion 224a in a direction opposite that of the elongate portions 230a, and are spaced from one another. Extending between the extruding portions 240a are dispensing recesses 242a. The body portion 224a has slits or elongate narrow openings 244a that extend from the dispending recesses 242a, through the body portion 224a and partly into the elongate portions 230, as shown in FIG. 11A. The second tip member 220a is capable of taking on an essentially conical shape due to the presence of the slits 244, i.e., such that the first tip member 220 narrows in a direction toward the extruding portions 240 when the flexible packaging 200 is filled with product 100. The extruding portions 240a provide for a desired surface pattern in the product 100 being extruded from the bag 200. In addition, because the second tip member 220a comprises a stiff material it has longitudinal strength and stiffness along the elongate portions 230a, elongate edge portions 232a and extruding portions 240a. This provides for a stiff, yet radially flexible, second tip member 220a, such that product can be easily and cleanly dispensed.

It is pointed out that the first and second tip members 220, 220a, respectively, do not need to have an identical shape. For example, the first tip member can have two extruding portions 240 and the second tip member can have four extruding portions 240a. This would allow a user to alter the shape of the product being dispensed by turning over the bag 200.

Figure 13:
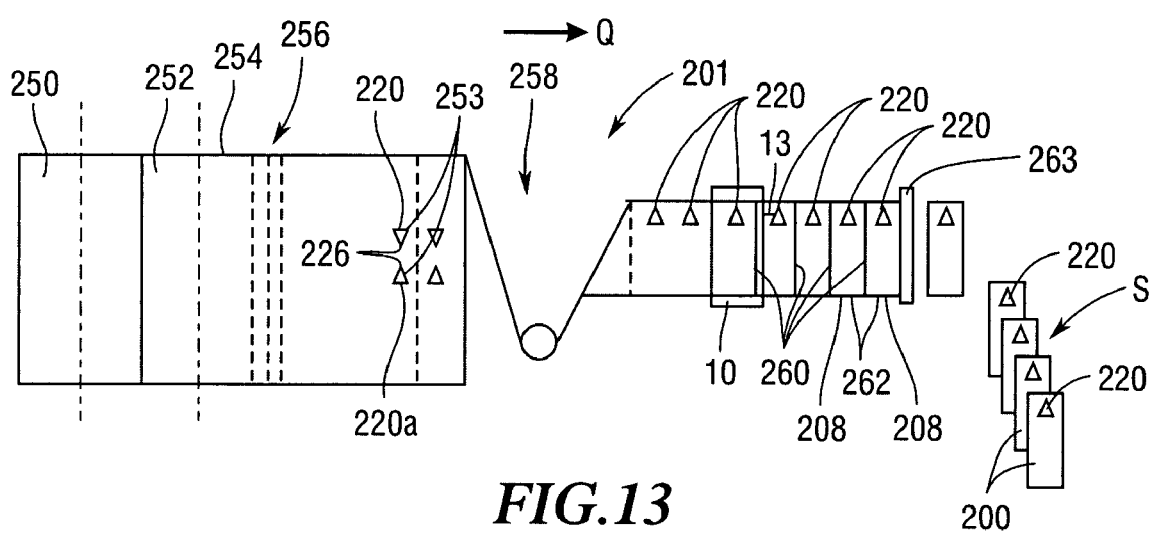
FIG. 13 is a diagrammatic view of the assembly line used for manufacturing flexible packaging or bag having the built-in tip.

To make the flexible packaging or bag 200 having the built in tip 202 reference is made to the diagrammatic view of FIG. 13 that shows an assembly line 201. The first act in the manufacture process is to provide a spool of film web 250 from which film 252 is pulled or advanced by a capstan 254, through a dancer assembly 256. The film 252 is pulled from the spool 250 in the direction of arrow Q in FIG. 13. The film 252 comprises, in one of the embodiments, the same materials as described above.

Next, the first and second tip members 220, 220a, respectively, are applied to the film 252. A carrier web (not shown)

carries the first and second tip members 220, 220a, respectively, to the film 252, where the carrier web is peeled away exposing an adhesive 253 on the first and second tip members 220, 220a, respectively. Carrier webs are well known to those having ordinary skill in the art. The adhesive 253 joins or adheres the first and second tip members 220, 220a, respectively, to the film 252. After joining, the first and second tip members 220, 220a, respectively, are symmetrically adhered to the film 252 as shown in FIG. 13, such that the first ends 226, 226a, respectively, point in a direction toward one another, as shown in FIG. 13. The film 252 is moved over a V-board 258 where it is folded over, such that the first and second members 220, 220a, respectively, overlie one another, and the first and second tip members 220, 220a, respectively, are aligned with one another. It is pointed out that depending on how the film to which the first and second tip members are adhered is moved over the V-board 258 and folded, the first and second built-in tip members 220, 220a, respectively, will be adhered to either the exterior surface 214 of the completed bag 200, or the interior surface 216 of the completed bag 200. If the first and second tip member 220, 220a, respectively are adhered to the interior surface 212 then they would contact one another upon folding the film 252. It can be appreciated that if the bag 200 is made to have the built-in tip 202 adhered to the interior surface 212, then better protection and cleanliness results, but on the other hand, if the built-in tip 202 is adhered to the exterior surface 214 manufacturing costs are decreased. Regardless if whether the first and second tip members 220, 220a, respectively, are adhered to the exterior surface 214 or interior surface 212 of the bag 200, they align with one another when the film 252 is folded.

In one of the embodiments, the above-described non-invasive tear mechanism 13 is formed in the folded film 252 by apparatus 10, such that the completed bag 200 will have a non-invasive tear mechanism 13. The non-invasive tear mechanism 13 extends along a line of weakness formed in the bag 200 and partly into the first and second tip members 220, 220a, respectively, as shown in FIG. 10. It is to be understood that the bag 200 does not need to have the non-invasive tear mechanism 13, and thus the use of apparatus 10 as shown in FIG. 13 is optional. If the bag or flexible packaging 200 is made without the non-invasive tear mechanism it is opened by pulling or cutting with, for example scissors. Or, the bag 200 can be opened if the bag is provided with a starter tear notch (not shown) proximal the built-in tip 202.

Next, heat seals 260 are formed in the film 252 by heat sealing processes to define the geometry of the bag 200 to be formed. FIG. 13 shows rectangular shaped bags 200. A fill opening 262 in the first end 208 is not heat sealed so that so that product 100 can be introduced into the bags 200 through the first end 208. The bag 200 shape is then lance cut at 263, thus separating the bags 200 from one another.

One of the advantages of this design is that the finished bags 200 allow for the convenient stacking as indicated by arrow S in FIG. 13 and easy handling of the bags, because the bags 200 will, remain flat when empty. This is because the first and second tip members 220, 222, respectively, are planar and lie flat atop one another. This is better than the prior art wherein stacking of empty bags is difficult because the tip is a solid conical body.

After the bag 200 is filled with product 100, a space between the first and second tip members 220, 220a, respectively, fills with product 100. When filled the first and second tip members 220, 220a, respectively, have an essentially conical shape. The slits 244, 244a, respectively, permit the first and second tip member 220, 220a, respectively, to flex outwardly thus facilitating formation of the conical shape of the tip 202 when the bag 200 is filled with product 100. After filling, the fill opening 262 can be heat sealed to securely retain the product in the bag 200.

In use, the bag 200 is made as described above and filled with product 100 and the load end 208 is sealed. To open the bag 200, the removable portion 217 is cut or pulled, thus allowing product 100 to be forced out of the bag 200 through the built-in tip 202. If the bag 200 has the non-invasive tear mechanism 13, then the user tears the non-invasive tear mechanism 13 and the product 100 can be forced out of the bag 200 through the built-in tip 202. In addition, tearing exposes the built-in tip 202 if, for example, it is adhered to the interior surface 212. If the built-in tip 202 is adhered to the exterior surface 214, then it is already exposed. It is to be understood that prior to tearing, the bag 200 would appear as the completed bag 200, as shown in FIG. 13. After opening, pressure is applied to the bag 200, and the product 100 housed therein is extruded. The extruded product 100 has a surface that is contoured or shaped by the extruding portions 240, 240a, respectively, of the first and second tip members 220, 220a, respectively. In the embodiment described herein, this causes the product 100 being extruded having a star-shaped cross section, making the product 100 being extruded suitable for decorating cakes, cookies, drinks and the like. It is to be understood that the built-in tip 202 described herein is also capable of dispensing non-edible materials and fluids.

In other embodiments the first and second tip members of the built in tip 202 can be formed or cut in any shape that allows the built-in tip 202 to conform to the cone shape of the bag 200, and provide stiff points on the ends of the first and second tip members of the built-in tip.

Another configuration of the bag 200 and built-in tip 202 provides excess film 252 at the built-in tip 202. This excess film 252 can be cuffed up while dispensing the product 100. The excess film 252 can also be folded down for protection of the built-in tip 202 when not in use. The excess film 252 can be clamped or twist tied for more durable storage of the product 100 in the flexible packaging or bag.

Figure 12:
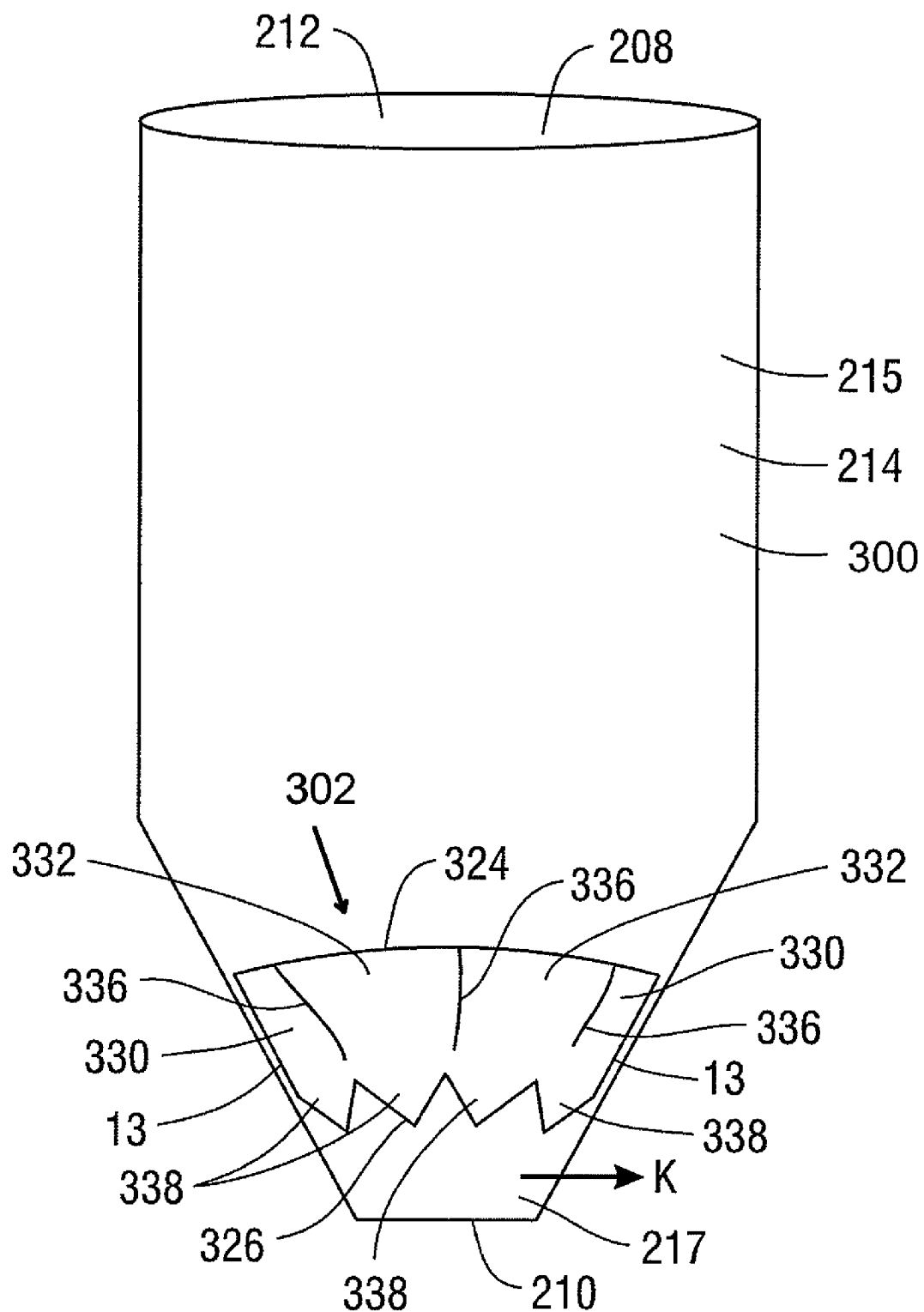
FIG. 12 is a perspective view of a bag or flexible packaging having a second embodiment of the built in tip.
Figure 12A:
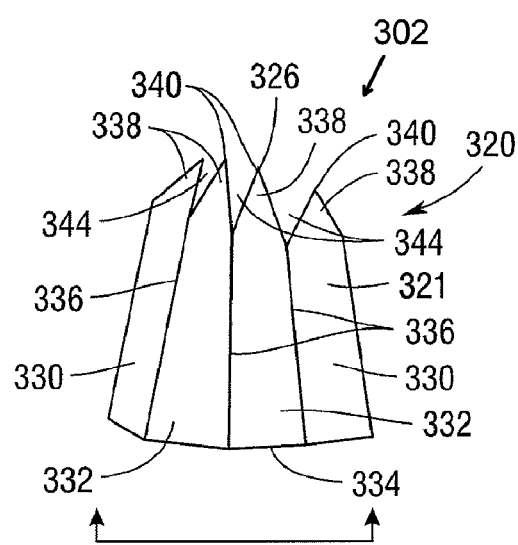
FIG. 12A is a top plan view of a first tip piece of the second embodiment of the built-in tip.
Figure 12B:
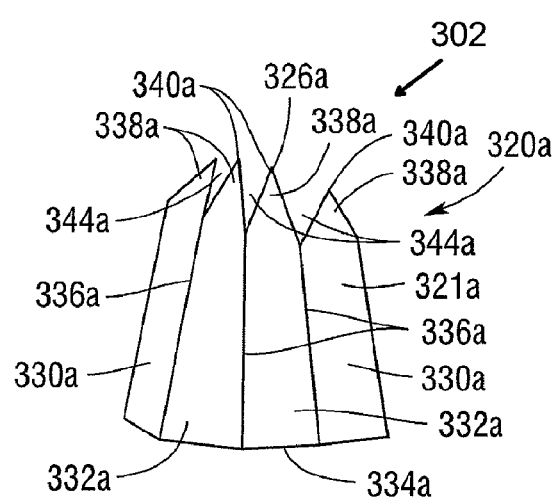
FIG. 12B is a top plan view of a second tip piece of the second embodiment of the built-in tip.

Another embodiment is shown in FIGS. 12, 12A and 12B of a flexible packaging 300 (also referred to herein as bag) having a built-in tip 302. In particular, FIG. 12 shows a plan view of the bag 300 having the build-in tip 302. The bag 300 has a load end 208, an opposed extruding end 210, an exterior surface 214 and interior surface 212. A bag side wall or surrounding wall 215 extends between the load end 208 and the extruding end 210. The bag 300 also has a removable portion 217 proximal the extruding end 210 that the user can manually remove as indicated by arrow K in FIG. 12. Once the removable portion 217 is removed, the product 100 internal to the bag 300 can be forced out of the bag 200 through the built-in tip 302. The bag 200 is made with or without the non-invasive tear mechanism 13.

The built-in tip 302 having first tip piece 320 and an identical second tip piece 320a, that are formed from a planar and made from a stiff material such as stiff polyester. The first tip piece 320 is formed by die cutting or stamping it from a sheet of plastic, for example, stiff polyester, or is formed by molding preferably die cut or stamped from a sheet of stiff plastic, for example, stiff polyester. The first tip piece 320 has a body 321 and a curved end 324 and opposed extruding end 326. The first tip piece 320 tapers inwardly in a direction from the curved and 324 to the extruding end 326. The first tip piece 320 has end segments 330 and inner segments 332. Moving from left to right in FIG. 12, there is an end segment 330, an inner segment 332, another inner segment 332 and an end segment 330. As shown in FIGS. 12A and 12B, there are slits commonly designated 336 that extend between the end segments 330 and inner segments 332. The slits 336 extend into the first tip piece 320 from the curved end 324 a minimal distance such that the first tip piece 320 is capable of taking on an essentially conical shape due to the presence of the slits 336, i.e., such that the first tip piece 320 narrows in a direction toward the extruding portion end 326 when the flexible packaging 200 is filled with product 100. The first tip piece 320 also has extrusion portions 338 having tips 340 that extend from the extruding end 326 thereof. Extending between the extruding portions 338 are dispensing recesses 344. This provides for a stiff, yet radially flexible, first tip piece 320.

The identical second tip piece 320a has The first tip piece 320a has a body 321a and a curved end 324a and opposed extruding end 326a. The first tip piece 320a tapers inwardly in a direction from the curved and 324a to the extruding end 326a. The first tip piece 320a has end segments 330a and inner segments 332a. Moving from left to right in FIG. 12, there is an end segment 330a, an inner segment 332a, another inner segment 332a and an end segment 330a. There are slits commonly designated 336a that extend between the end segments 330a and inner segments 332a. The slits 336a extend into the second tip piece 320a from the curved end 324a a minimal distance such that the second tip piece 320a is capable of taking on an essentially conical shape due to the presence of the slits 336a, i.e., such that the second tip piece 320a narrows in a direction toward the extruding portion end 326a when the flexible packaging 200 is filled with product 100. The first tip piece 320a also has extrusion portions 338a having tips 340a that extend from the extruding end 326a thereof. Extending between the extruding portions 338a are dispensing recesses 344a. This provides for a stiff, yet radially flexible, first tip piece 320a.

It is pointed out that the first and second tip pieces 320, 320a, respectively, do not need to have an identical shape. For example, for example the first tip piece 320 can have two extruding portions 338 and the second tip piece 320a can have four extruding portions 338. This would allow a user to alter the shape of the product being dispensed by turning over the bag 200.

The method of making the bag 300 having the built-in tip 302 is the same as that described above in connection with the prior embodiment. The bag 300 is made with or without the non-invasive tear mechanism 13. If it has the non-invasive tear mechanism, then it would appear as shown in FIG. 12 that extends though the bag 200 and partly in the first and second tip pieces 320, 320a, respectively, as shown. If the bag 300 is made without the non-invasive tear mechanism 13, then it is openable with scissors or by pulling on the removable portion 217.

Figure 14:
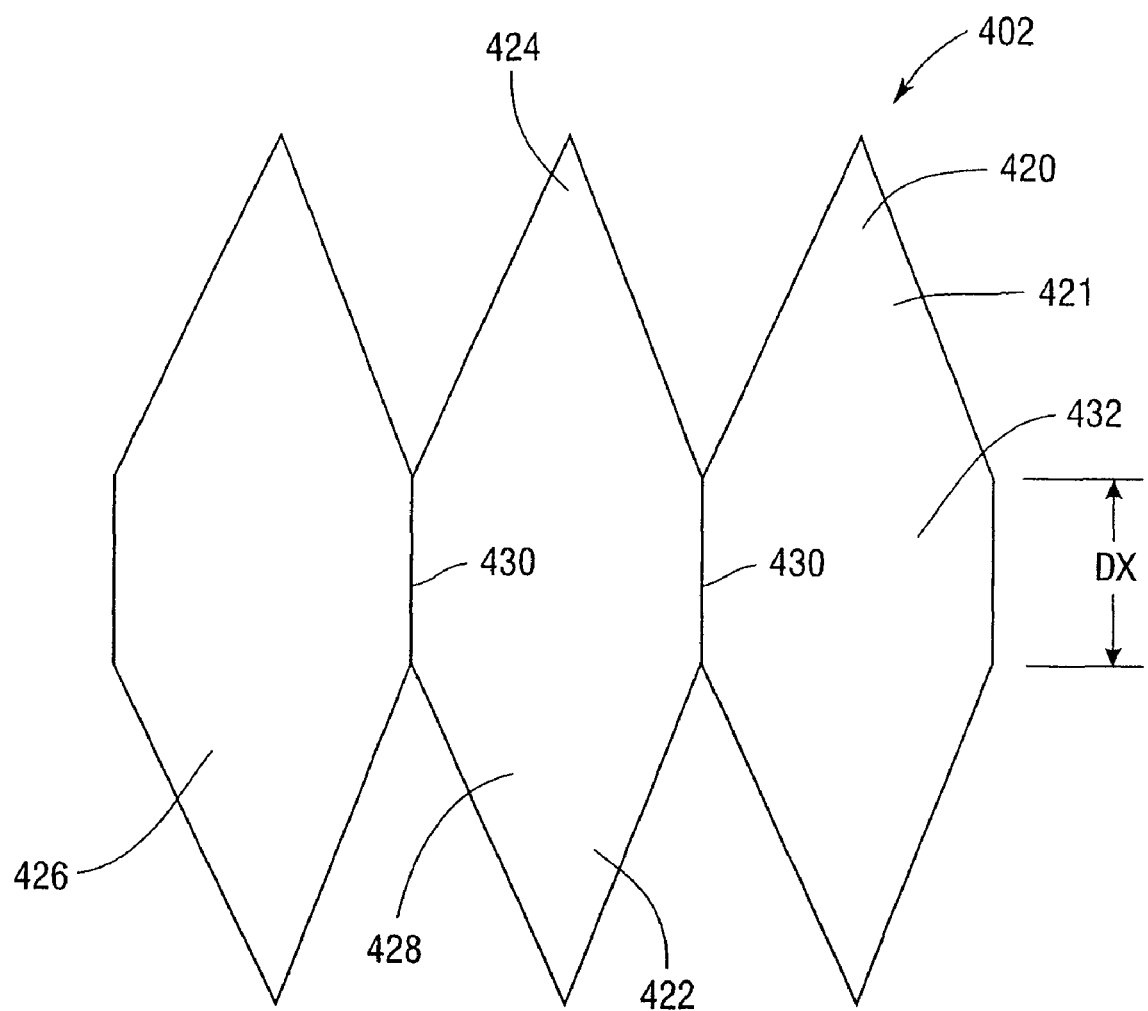
FIG. 14 is a top plan view of another embodiment of the built-in tip.

In another embodiment shown in FIG. 14 there is a built-in tip 402 that has a first tip component 420 and an identical second tip component (not shown) that are each planar and made from a stiff material such as stiff polyester. The first tip component 420 is formed by die cutting or stamping it from a sheet of plastic, for example, or it is formed by molding.

The first tip component 420 has a body 421 and a toothed end 422 and an opposed extruding end 424. There is a first diamond portion 426 joined to a second diamond portion 428 with a joining portion 430, and a third diamond portion 432 joined to the second diamond portion 428 with a joining portion 430. The joining portions 430 are of minimal length designated DX in FIG. 14 such that the 421 is capable of taking on an essentially conical shape due to the presence of the joining portions 430 having a minimal length, i.e., such that the first tip component 420 narrows in a direction toward the extruding end 424 when the flexible packaging 200 is filled with product 100. The method of making a bag 200 with the built in tip 402 would remain the same as described above. In addition, the first tip component and second tip component do not need to be identical as described above in connection with the prior embodiments.

Figure 15:
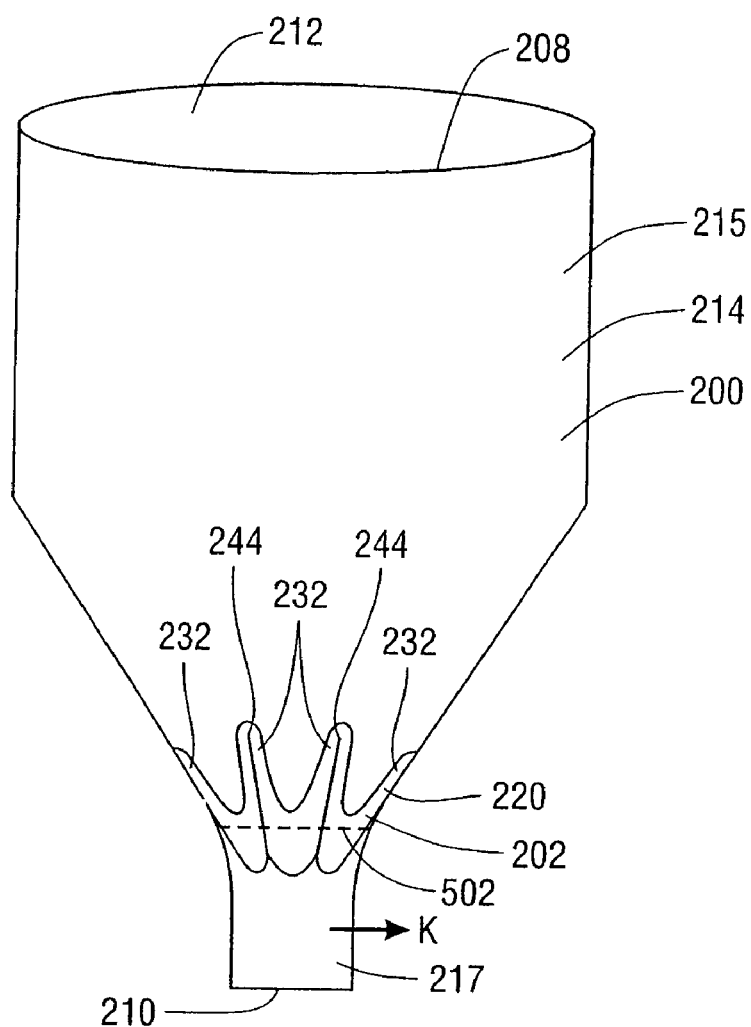
FIG. 15 is a perspective view of a flexible packaging having serrations for opening the flexible packaging.
Figure 16:
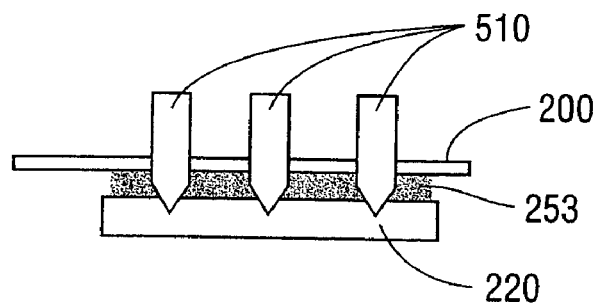
FIG. 16 is a sectional view showing knives making non-invasive serrations in the flexible packaging.

FIG. 15 shows a top plan view of a bag or flexible packaging 200 having non-invasive cuts 502 for opening the bag 200. The bag is the same as bag 200 as shown in FIGS. 10, 11A and 11B and described above, and does not have the non-invasive tear mechanism 13. Non-invasive cuts 502 are made in the bag 200. The non-invasive cuts 502 are made with a knife or knives 510, as shown in FIG. 16. FIG. 16 shows the knives after they have made the non-invasive cuts 502 and immediately before they are retracted. The non-invasive cuts 502 are non-invasive because they do not penetrate completely through the first tip member 220, as shown in FIG. 16. Thus, thus the product housed inside the bag 200 cannot escape through the non-invasive cuts 502. It is to be understood that the second tip member 220a (not shown) also has non-invasive cuts 502. To make the non-invasive cuts 502, the assembly line 201 has a non-invasive cutting tool (not show) instead of apparatus 10. Cutting tools well known to those having ordinary skill in the art.

Figure 17A:
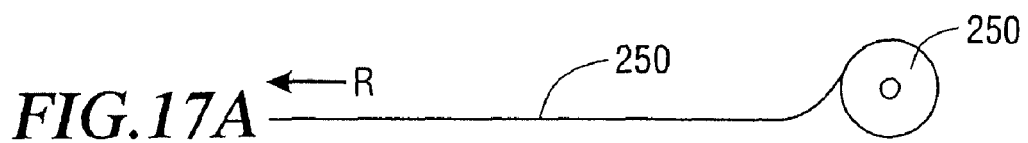
FIGS. 17A-17G show front elevational views of a second method for making a flexible packaging having a built-in tip.
Figure 17B:
Figure 17C:
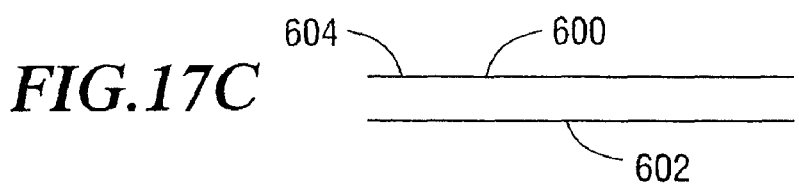
Figure 17D:
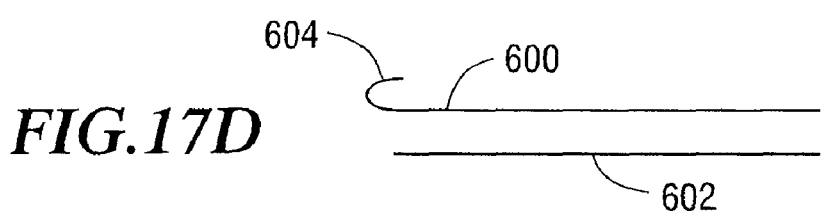
Figure 17E:
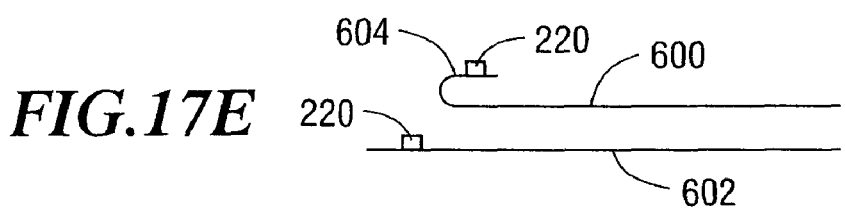
Figure 17F:
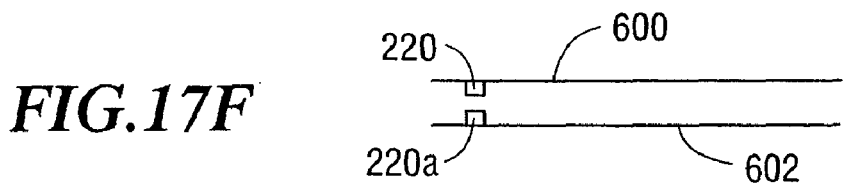
Figure 17G:
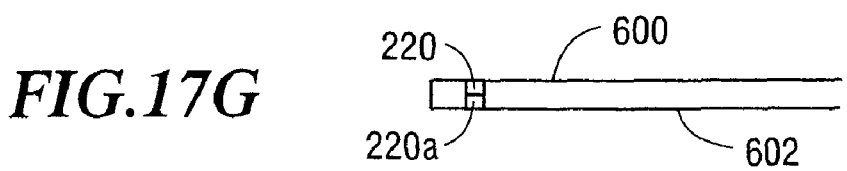

FIGS. 17A-17G show another embodiment of making a bag 200 having a built in tip 202. As shown in FIG. 17A there is the film web 250 pulled from a spool 250 in the direction of arrow R. The film web 250 is folded over on itself by a V-guide in the manner described above and sliced in half by a stationary knife as shown in FIGS. 17B and 17C to form first and second strips 600, 602, respectively, of material from which the bag 200 is made. Next, first end 604 of the first strip 600 is folded in upon itself as shown in FIG. 17D. Then, the first tip member 220 is adhered to the folded portion of the first strip 600, and the second tip member 220a is adhered to the second strip 602, as shown in FIG. 17E. The first strip 600 is folded back to its original position such that it is again planar, and the first and second tip members 220, 220a, respectively, face one another, as shown in FIG. 17F. The first and second strips 600, 602, respectively are heat sealed along their peripheries to thus form the bag 200, as shown in FIG. 17G, and the non-invasive tear mechanism 13 or the non-invasive cuts 502 are then formed in the bag 200 in the manner described above. The bag 200 can also be embodied without the non-invasive tear mechanism 13 and the non-invasive cuts 502.

Thus, the built-in tip 202 decreases production costs, provides for flat handling of the bags 200, is inexpensive, eliminates choking problems associated with unattached tips and eliminates alignment problems associated with the unattached tips. Also, the built-in tip 202 allows for improved dispensing of product 100 housed in the flexible packaging or bag 200.

While the built-in tip has been described in connection with certain embodiments, it is not intended to limit the scope of the build in tip to the particular forms set forth, but, on the contrary, it is intended to cover such alternatives, modifications, and equivalents as may be included within the spirit and scope of the built-in tip.

What is claimed:
1. A bag comprising:
   a surrounding wall having an exterior surface and an opposed interior surface;
   a first end and an opposed extruding end;
   a built-in tip joined to the interior surface proximal the extruding end of the bag;
   wherein the built-in tip comprises a first tip member and a second tip member joined to the interior surface of the bag with an adhesive;

wherein each of the first tip member and second tip member has a body portion with elongate portions and edge portions extending from the body portion and recesses extending between the edge portions and elongate portions;

wherein each of the first tip member and second tip member has extruding portions that extend from the body portion in a direction opposite that of the elongate portions; and, wherein each of the first tip member and second tip member has dispensing recesses that extend between the extruding portions and wherein the body portion of the first member has slits that extend from the dispensing recesses through the body portion and partly into the elongate portions and the body portion of the second member each has slits that extend from the dispensing recesses through the body portion and partly into the elongate portions such that the first tip member and second tip member are capable of taking on a conical shape.

2. The bag according to claim 1 further comprising a noninvasive tear mechanism formed in the bag such that the bag can be opened by tearing the noninvasive tear mechanism.

3. The bag according to claim 1 further comprising non-invasive cuts in the bag such that the bag can be opened by tearing the non-invasive cuts.

4. A bag comprising:
a surrounding wall having an exterior surface and an opposed interior surface,
a first end and an opposed extruding end;
a built-in tip joined to the interior surface proximal the extruding end of the bag;
wherein the built-in tip has a first tip piece and a second tip piece each having end segments and inner segments with slits that extend into the first tip piece from the extruding end such that the first tip piece is capable of taking on a conical shape.

5. A bag comprising:
a surrounding wall having an exterior surface and an opposed interior surface,
a first end and an opposed extruding end, and
a built-in tip joined to the interior surface proximal the extruding end of the bag, the built-in tip having a first tip component with a toothed end and an opposed extruding end, and further having a first diamond portion joined to a second diamond portion with a joining portion, and a third diamond portion joined to the second diamond portion with a joining portion, and wherein the joining portions have a minimal length such that the first tip component is capable of taking on a conical shape.

6. A bag comprising:
a surrounding wall having an exterior surface and an opposed interior surface;
a first end and an opposed extruding end;
a built-in tip joined to the interior surface proximal the extruding end of the bag;
wherein the built-in tip comprises a first tip member and a second tip member joined to the interior surface of the bag;
wherein each of the first tip member and second tip member has a body portion with elongate portions and edge portions extending from the body portion and recesses extending between the edge portions and elongate portions;
wherein each of the first tip member and second tip member has extruding portions that extend from the body portion in a direction opposite that of the elongate portions; and,
wherein each of the first tip member and second tip member has dispensing recesses that extend between the extruding portions and wherein the body portion of the first member has slits that extend from the dispensing recess through the body portion and partly into the elongate portions and the body portion of the second member each has slits that extend form the dispensing recesses through the body portion and partly into the elongate portions such that the first tip member and second tip member are capable of taking on a conical shape.

7. A bag comprising:
a surrounding wall having an exterior surface and an opposed interior surface;
a first end and an opposed extruding end;
a built-in tip joined to the interior surface proximal the extruding end of the bag;
wherein the built-in tip comprises a tip member joined to the interior surface of the bag;
wherein the tip member has a body portion with elongate portions and edge portions extending from the body portion and recesses extending between the edge portions and elongate portions;
wherein the tip member has extruding portions that extend from the body portion in a direction opposite that of the elongate portions; and, wherein the tip member has dispensing recesses that extend between the extruding portions and wherein the body portion of the tip member has slits that extend from the dispensing recesses through the body portion and partly into the elongate portions such that the tip member is capable of taking on a conical shape.

* * * * *